United States Patent [19]

Cheng

[11] Patent Number: 4,854,007
[45] Date of Patent: Aug. 8, 1989

[54] DUST-PROOF CASTER WITH A BRAKE MECHANISM

[76] Inventor: Chih-Jen Cheng, No. 69-10, Ta Fung Road, San Ming Dist., Kaohsiung City, Taiwan

[21] Appl. No.: 221,414

[22] Filed: Jul. 19, 1988

[51] Int. Cl.⁴ ............................................. B60B 33/00
[52] U.S. Cl. ..................................... 16/18 A; 16/35 R; 188/1.12; 188/329
[58] Field of Search ............................ 16/18 A, 35 R; 188/1.12, 249, 329, 330

[56] References Cited

U.S. PATENT DOCUMENTS

| | | | |
|---|---|---|---|
| 1,671,759 | 5/1928 | Bendix | 188/249 X |
| 1,950,260 | 3/1934 | Nelson | 188/249 |
| 2,539,108 | 1/1951 | Shepherd | 16/18 A |
| 3,159,865 | 12/1964 | Shepherd | 16/18 A X |
| 3,177,516 | 4/1965 | Price et al. | 16/18 A |
| 3,235,901 | 2/1966 | Rice et al. | 16/18 A |
| 3,238,558 | 3/1966 | Greene | 16/35 R |
| 4,144,617 | 3/1979 | McCarroll | 16/18 A |

Primary Examiner—Fred A. Silverberg
Attorney, Agent, or Firm—Browdy and Neimark

[57] ABSTRACT

The present disclosure relates to a dust-proof caster assembly including a caster having a peripheral annular recess disposed thereon and a casing having a corresponding annular peripheral flange which can be fitly engaged with the annular recess when the caster and the casing are assembled together, thus effectively preventing dust or fragmental threads in a textile factory from getting into the fissure between the wheel hub and the bearing, improving the operation of the caster and enhancing the longevity thereof.

5 Claims, 2 Drawing Sheets

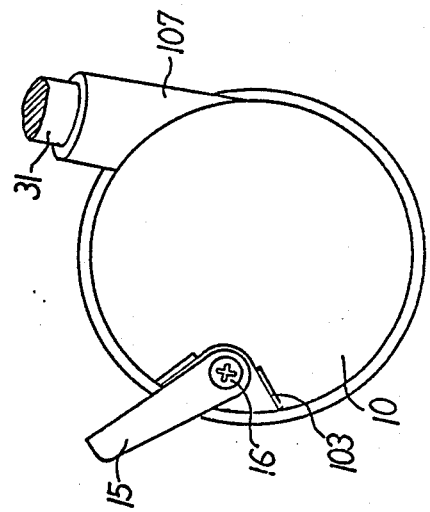
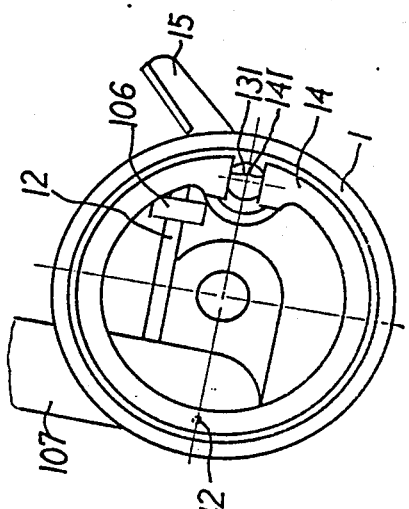
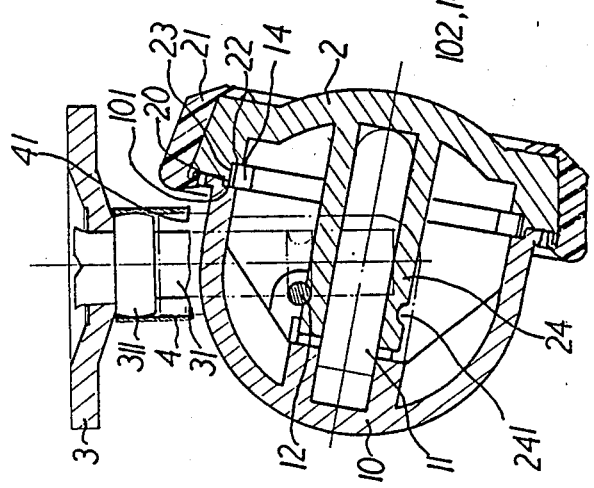

DUST-PROOF CASTER WITH A BRAKE MECHANISM

BACKGROUND OF THE INVENTION

1. Field of the Invention

The present invention relates to a dust-proof caster with a brake mechanism.

2. The Prior Art

Prior casters of various types have been widely applied to all kinds of wheelbarrows or pushcarts due to the nimble nature thereof. However, some shortcomings are found in the application of the prior casters to wheelbarrows or pushcarts operated in a textile factory or a dusty factory. When rolling on the ground of such factories, the prior casters always tend to be blocked and worn out because of the fragmental threads or dust stuffed between the wheel hubs and the bearings of the casters, causing bad effects on the normal operation of the caster.

SUMMARY OF THE INVENTION

It is therefore an object of the present invention to provide a dust-proof caster having a casing closely mounted to the caster for preventing dust or fragmental threads from getting into the fissure between the wheel hub and the bearing, thus maintaining the nimble operation of the caster.

It is a further object of the present invention to provide a dust-proof caster having an external wheel circle the diameter of which is reduced from the inner end to the outer end, permitting the caster to roll on the ground with its rotary axis inclined with respect to the horizontal, thus decreasing the laterally slanting moment exerted upon the caster and consequently increasing the total load that the caster can bear.

It is still a further object of the present invention to provide a dust-proof caster having a brake mechanism which can produce frictional brake effect to stop the caster when necessary.

BRIEF DESCRIPTION OF THE DRAWINGS

The features and advantages of the present invention will become more apparent from the following description in connection with the accompanying drawings in which:

FIG. 2 is a longitudinally sectional view of the present invention, showing the wheel hub and rotary shaft rotatably secured to the casing by a securing latch; and FIG. 3 and FIG. 4 illustrate the brake mechanism of the present invention.

DETAILED DESCRIPTION OF THE PREFERRED EMBODIMENT

Figure 1:
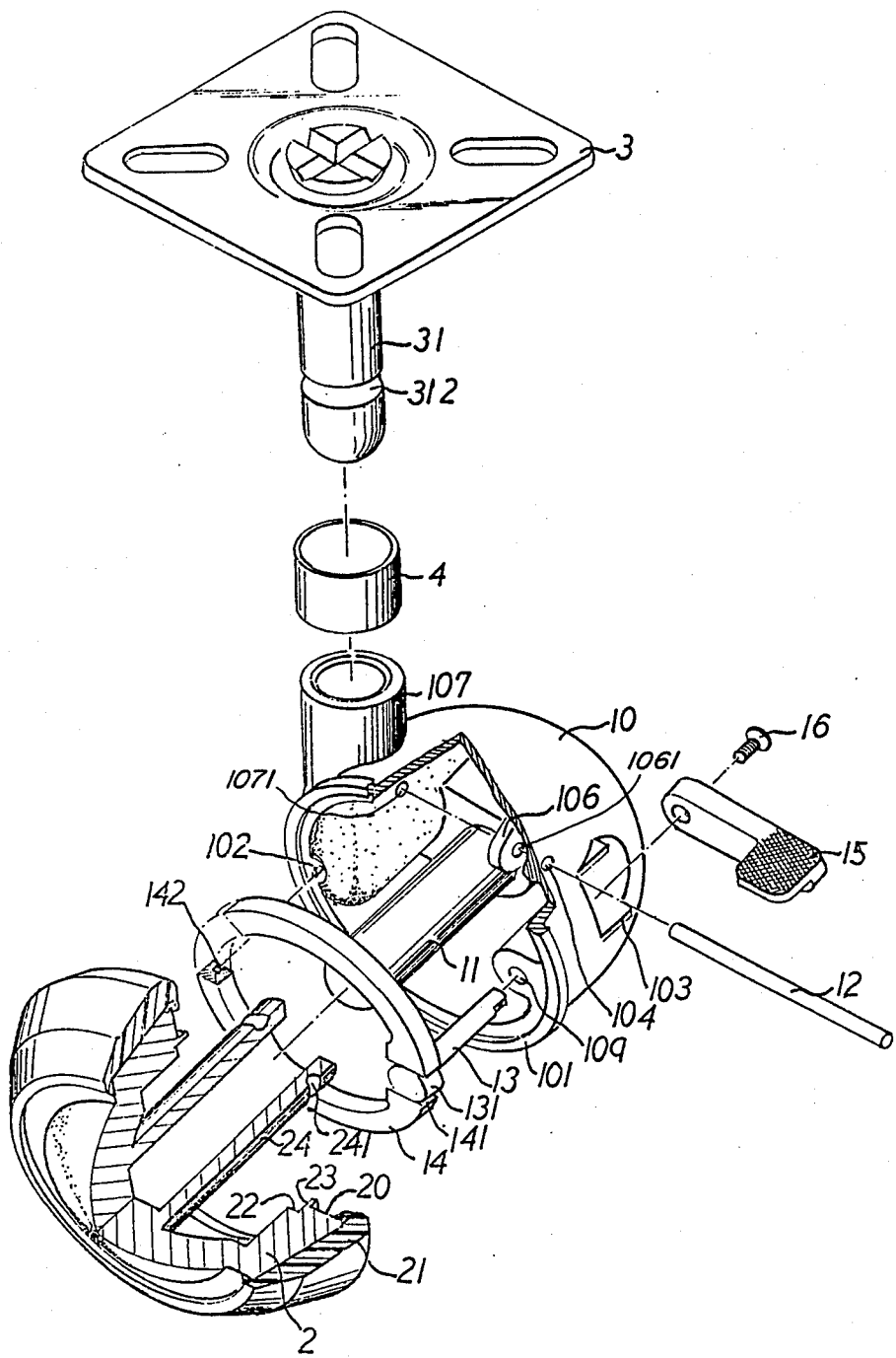
FIG. 1 is an exploded perspective view of the present invention.

Referring now to FIG. 1, the present dust-proof caster includes a casing 10, a caster 2 and a bracket board 3. The casing 10 is generally formed in a hemispherical shell shape with a bearing 11 axially projected from the central portion thereof. A wheel hub 24 correspondingly located at the central portion of the caster 2 can be mounted on the bearing 11 in assembly, permitting the caster 2 to rotate thereabout. An external wheel circle 21 is provided around the periphery of the caster 2 for reinforcement thereof. The diameter of the wheel circle 21 is reduced from the inner end to the outer end along the axis thereof and, as shown in FIG. 2, when the peripheral surface of the wheel circle 21 is in full contact with the ground, the bearing 11 of the casing 10 is inclined with respect to the horizontal. As a consequence, the effective force normal to the bearing 11 is reduced, thus accordingly decreasing the laterally slanting moment exerted upon the caster 2 so to increase the load bearing capacity thereof. Furthermore, an annular recess 20 is formed on the periphery of the inner side of the caster 2 for fitly engaging with a corresponding annular flange 101 formed on the outer side of the wheel casing 10 when the caster wheel 2 is assembled with the casing 10, thus preventing the fissure between the hub 24 and the bearing 11 from being stuffed with dust or fragmental threads when operated in a textile factory.

A supporting sleeve 107 is associated with the casing 10 for fitly receiving a rotary shaft 31 of the bracket board 3 therein, permitting the casing 10 to rotate thereabout. The upper end of the supporting sleeve 107 abuts against a shoulder 311 of the shaft 31 (shown in FIG. 2) as the shaft 31 is inserted into the supporting sleeve 107. A cover hoop 4 is provided around the shoulder 311 with its inner peripheral flange 41 surrounding the supporting sleeve 107, preventing the dust or fragmental threads from getting into the fissure between the shaft 31 and sleeve 107 and blocking the normal operation of the casing 10 with respect to the shaft 31.

Further referring to FIG. 1 and FIG. 2, two annular grooves 241 and 312 having like semicircular cross-sections are formed on the peripheries of the hub 24 and rotary shaft 31 respectively. Thus, when a corresponding securing latch 12 is inserted through three coaxially formed latch holes 104, 1061 and 1071 located respectively on the casing 10, a lug 106 provided therein and the supportig sleeve 107, coincidentally going through the wheel hub 24 and rotary shaft 31 within the annular grooves 241 and 312, the caster 2 and the bracket board 3 are rotatably connected with the casing 10 without ready detachment from each other (as shown in FIG. 2).

Additionally, a circular brake member 14 is attached to the casing 10 with a projecting pin 102 thereof extending through its corresponding pin hole 142. A brake controlling shaft 13 is disposed through a corresponding shaft hole 109 of the casing 10 with its cam portion 131 clamped within a cut-out portion 141 of the circular brake member 14. Thus, when a handle 15 is secured to the brake controlling shaft 13, the shaft 13 can coact with the handle 15 to urge the brake member 14 to operate against a brake surface 22 of the caster 2, producing frictional brake effect as shown in FIG. 3.

With the above arrangements, the disadvantages of the prior caster as blocking or wearing out due to stuffing dust or fragmental threads can be effectively eliminated, thus improving the operation of the caster and enhancing the longevity thereof.

What is claimed is:

1. A dust-proof caster with a brake mechanism, comprising:
   a caster having a wheel hub extending inwardly thereof;
   a casing comprising a bearing extending inwardly thereof which is fitly received in said wheel hub, a supporting sleeve extending outwardly thereof, and an annular flange formed on a periphery of said casing;
   a bracket board having a rotary shaft fitly rotatably received in said supporting sleeve;

an external wheel circle provided around a periphery of said caster for increasing the strength thereof, the diameter of said external wheel circle being reduced from an inner end to an outer end along the axis thereof and consequently, when the peripheral surface of said wheel circle is in full contact with the ground, said bearing together with said wheel hub are inclined with respect to the horizontal, thus the laterally slanting moment exerted upon said caster can be reduced due to the effective force normal to said bearing being reduced;

an annular recess formed on a periphery of said caster for fitly accommodating said annular flange of said casing when said caster is assembled with said casing for forming a tight seal between said caster and said casing for preventing dust or fragmental threads from getting into the fissure between said wheel hub and said bearing;

a shoulder defined around said rotary shaft of said bracket board, abutting against an upper end of said supporting sleeve to form a joint therebetween when said rotary shaft is inserted thereinto; and a separate cover hoop provided around said shoulder with an inner peripheral flange closely surrounding said supporting sleeve and covering the joint between the supporting sleeve and the shoulder for preventing dust or fragmental threads from getting into the fissure between said rotary shaft and said supporting sleeve.

2. The dust-proof caster according to claim 1, further comprising:

an annular groove disposed on a periphery of said wheel hub;

a corresponding annular groove defined on a periphery of said rotary shaft;

corresponding latch holes formed in said casing; and a securing latch for insertion through said latch holes and said wheel hub and said rotary shaft within said annular grooves to rotatably connect said caster, said bracket board and said wheel casing without ready separation from each other.

3. The dust-proof caster according to claim 2, further comprising:

a circular brake member associated with said casing; and a brake controlling shaft having a cam portion at one end thereof, said cam portion being clamped within a cut-out portion of said brake member, said brake controlling shaft having another end inserted into a corresponding shaft hole of said wheel casing, wherein said cam portion is adapted to urge said brake member to abut against a brake surface of said caster, producing a frictional brake effect.

4. A dust-proof caster with a brake mechanism, comprising:

a caster having a wheel hub extending inwardly thereof;

a casing comprising a bearing extending inwardly thereof which is fitly received in said wheel hub, a supporting sleeve extending outwardly thereof, and an annular flange formed on a periphery of said casing;

a bracket board having a rotary shaft fitly rotatably received in said supporting sleeve;

an annular recess formed on a periphery of said caster for fitly accommodating said annular flange of said casing when said caster is assembled with said casing for forming a tight seal between said caster and said casting for preventing dust or fragmental threads from getting into the fissure between said wheel hub and said bearing;

a shoulder defined around said rotary shaft of said bracket board, abutting against an upper end of said supporting sleeve to form a joint therebetween when said rotary shaft is inserted thereinto; and a separate cover hoop provided around said shoulder with an inner peripheral flange closely surrounding said supporting sleeve and covering the joint between the supporting sleeve and the shoulder for preventing dust or fragmental threads from getting into the fissure between said rotary shaft and said supporting sleeve.

5. The dust-proof caster according to claim 2, further comprising:

a circular brake member associated with said casing; and a brake controlling shaft having a cam portion at one end thereof, said cam portion being clamped with a cut-out portion of said brake member, said brake controlling shaft having another end inserted into a corresponding shaft hole of said wheel casting, wherein said cam portion is adapted to urge said brake member to abut against a brake surface of said caster, producing a frictional brake effect.

* * * * *